Figure 1:
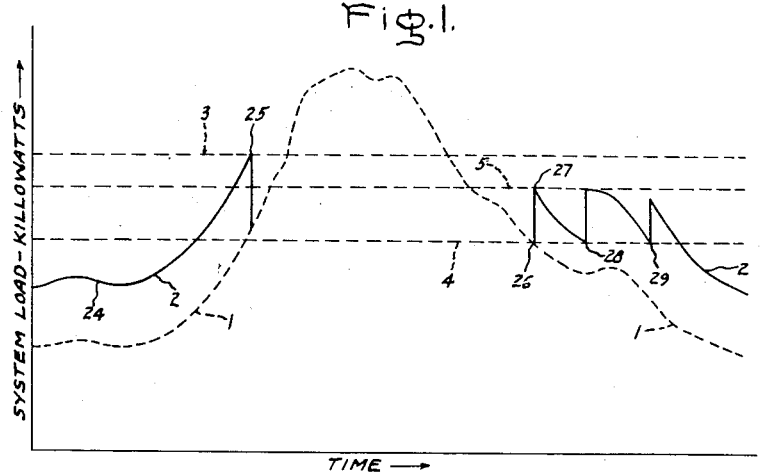

June 9, 1953  D. R. HYER ET AL  2,641,716
LOAD CONTROL APPARATUS
Filed June 27, 1952  2 Sheets-Sheet 1

Inventors:
Donald R. Hyer,
Edward E. Lynch,
by Richard E. Hooley
Their Attorney.

June 9, 1953  D. R. HYER ET AL  2,641,716
LOAD CONTROL APPARATUS
Filed June 27, 1952  2 Sheets-Sheet 2
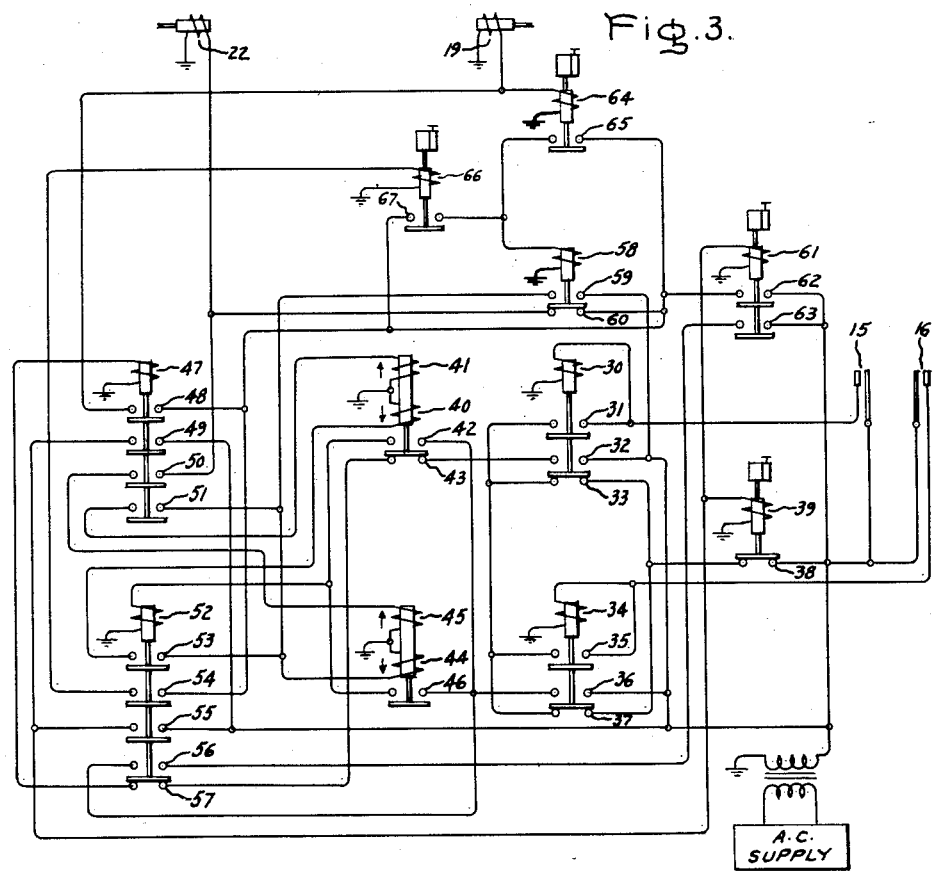
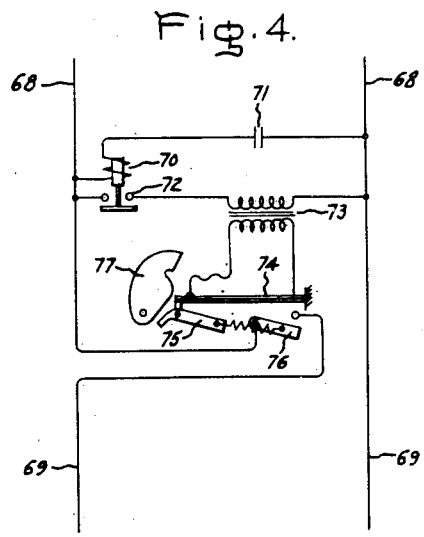
Inventors:
Donald R. Hyer,
Edward E. Lynch,
by Richard E. Hosley
Their Attorney.

Patented June 9, 1953

2,641,716

UNITED STATES PATENT OFFICE 2,641,716

LOAD CONTROL APPARATUS

Donald R. Hyer, Peabody, and Edward E. Lynch, Wakefield, Mass., assignors to General Electric Company, a corporation of New York Application June 27, 1952, Serial No. 295,888

7 Claims. (Cl. 307—35)

This invention relates to improvements in load control apparatus for electric power distribution systems employing carrier-current signals to connect or disconnect, selectively, with the system a plurality of load devices such as domestic water heaters.

It is sometimes desired that certain load devices, such as domestic water heaters, be connected to an electric power distribution system only when the total power requirements on the system are less than a predetermined value, and that these load devices being disconnected from the system during those periods of the day when power requirements of other types place peak demands upon the system. This is sometimes called "off-peak load control." It has previously been proposed that the connection and disconnection of the load devices be controlled by carrier-current signals transmitted through the distribution system. The present invention relates to improved load control apparatus which overcomes disadvantages encountered in prior systems of this type.

When all water heaters have been disconnected from an electric power distribution system for a period of time, an unusually heavy water heater power load may be encountered if all the heaters are reconnected simultaneously, since the water in many of the heaters may be below the set temperature. To avoid this, it is desirable that the heaters be reconnected to the system in controlled increments; that is, only a part of the water heaters are connected at first to add a desired incremental load to the system, and other heaters are connected to the system at a later time, after the first heaters have had a chance to bring their water up to the set temperature or the system load has decreased by a greater amount. One object of the present invention is to provide improved apparatus for such incremental control.

Another object of the invention is to provide improved apparatus which responds quickly to changing trends in the power requirements on the system, but does not respond to sudden brief fluctuations, usually lasting one minute or less.

Another object of the invention is to provide improved load control apparatus in which the adverse effects of relay chatter or minimized.

Other objects and advantages will appear as the description proceeds.

Our invention will be better understood from the following description taken in connection with the accompanying drawings, and its scope will be pointed out in the appended claims.

Figure 2:
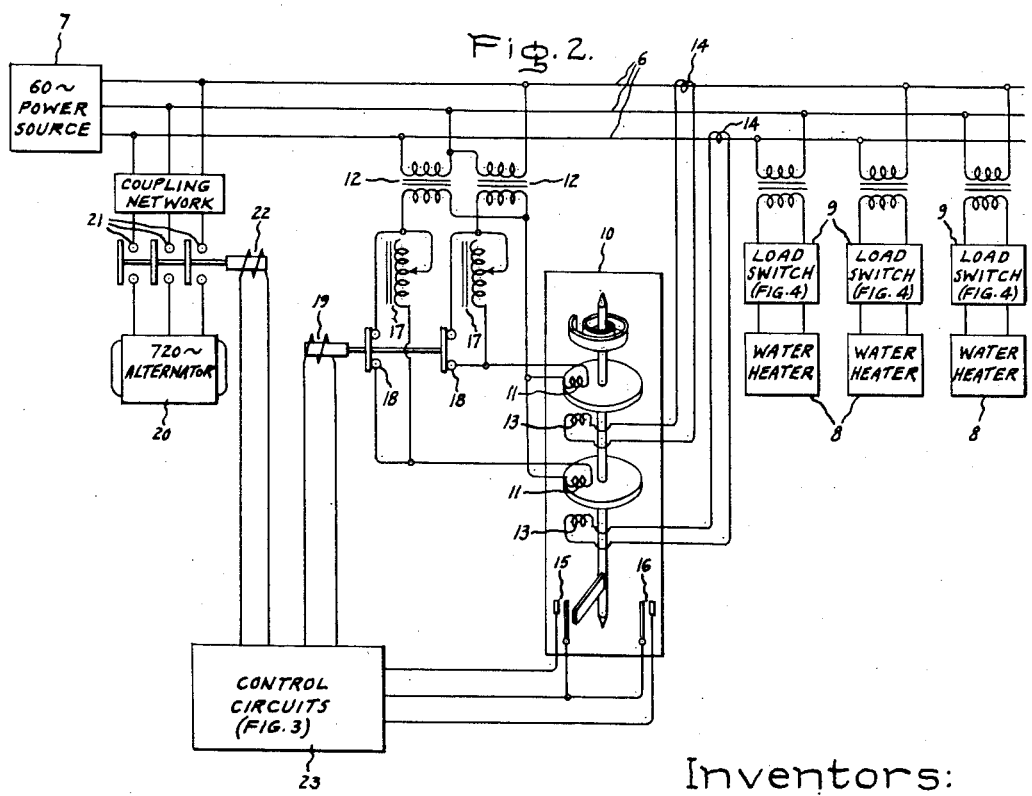

In the drawings,

Fig. 1 is a graphical representation of varying power requirements on an electric power distribution system, Fig. 2 is a schematic diagram illustrating improved load control apparatus embodying principles of our invention, Fig. 3 is a simplified circuit diagram of control ircuits used in the Fig. 2 apparatus, and Fig. 4 is a schematic diagram of a load switch which may be used in the Fig. 2 apparatus.

Referring now to Fig. 1, the broken line 1 is a curve which represents the power requirements of devices other than water heaters on a hypothetical electric power distribution system. This curve shows the relation between kilowatts of system load and the time of day. It will be noted that at certain periods of the day the power requirements on the system are much greater than at other periods of the day.

Line 2, Fig. 1, represents the total power requirements on the distribution system when domestic hot water heaters are added under control of our improved load control apparatus. All of the water heaters are connected to the system, usually through individual thermostatic controls, until the total power requirements on the system reach the level represented by broken line 3. At this point, all of the water heaters are disconnected from the system, and therefore do not add to the peak power requirements on the system. All of the water heaters remain disconnected until the power requirements on the distribution system fall below the level represented by broken line 4. When this occurs, a sufficient number of water heaters are reconnected to the system to add an incremental load which brings the total power requirements on the system to the level represented by broken line 5. No additional heaters are connected to the system until the power requirements again fall to the level represented by line 4. Then, more water heaters are connected to the system until the power requirements again reach the level represented by line 5. This process of adding water heaters to increase the load by a desired incremental amount is repeated until all of the water heaters are reconnected to the system, or until the system load again exceeds the level represented by line 3, at which point the heaters would be disconnected.

Fig. 2 illustrates our improved apparatus for controlling the power system load in the desired manner. In Fig. 2, the lines 6 represent a three-phase electric power distribution system supplied, for example, by 60 cycle alternating current from any suitable power source 7. A plurality of domestic hot water heaters 8, or other load devices, are connected to the distribution system through a plurality of load switches 9. Although only three water heaters and load switches are illustrated, there are usually hundreds of hot water heaters, each with its individual load switch, connected to a single distribution system.

The load switches 9, which are commercially available, are actuated by 720 cycle carrier-current signals transmitted through the distribution system as hereinafter explained. These load switches operate to connect their associated heaters to the system upon receipt of a carrier-current signal of three to twelve seconds' duration, the exact time required for connection being randomly variable among a large number of switches. For example, a signal of four seconds' duration is sufficient to turn on some of the load switches, thus connecting some of the water heaters to the distribution system, while a five second signal is required to turn on other switches, a six second signal for still others, and so forth. A signal of twelve seconds' duration turns on all of the load switches, and thus connects all of the water heaters to the distribution system. However, if the carrier-current signal continues for a period longer than 20 seconds, the load switches begin to turn off, and thus disconnect their associated water heaters from the system. A 40 second signal disconnects all of the water heaters.

The power requirements on the system are monitored by a watt-responsive relay 10 of a commercially available type. Relay 10 has a pair of potential coils 11 connected to the distribution system through transformers 12 and a pair of current coils 13 connected to the distribution system through transformers 14. Induction from these coils provides a torque which tends to rotate a rotor, and such rotation is restrained by a spring so that the angular position of the rotor is a function of electric power, as is well known. Relay 10 also has two sets of electrical contacts. Contacts 15 are closed by the rotor whenever the power requirements on the system fall below a first preset value. Contacts 16 are closed by the rotor whenever the power requirements exceed a second greater preset value. In practice, contacts 15 are set for the load value at which it is desired to add water heaters to the system, represented by line 4 in Fig. 1, while contacts 16 are set for the value at which it is desired to disconnect all water heaters from the system, represented by line 3 in Fig. 1.

To provide incremental control, two adjustable inductors 17, or other suitable impedance elements, are connected in series with potential coils 11. These inductors are shunted by the normally closed contacts 18 of a relay 19, and therefore have no effect except when relay 19 is actuated by energizing its coil. When the relay is actuated, contacts 18 open, thus effectively connecting inductors 17 in the circuit in series with the potential coils of relay 10. This has the effect of applying a bias to relay 10 by reducing the current through potential coils 11 which raises the preset value below which contacts 15 are closed. This will keep contacts 15 closed, thereby continuing the addition of water heaters to the system as hereinafter explained, until a sufficient increment of load has been added to the system to overcome the bias produced by inductors 17. The amount of this increment is adjustable by adjusting the value of the inductors. The load value at which this bias is overcome and contacts 15 reopen is represented in Fig. 1 by broken line 5.

The carrier-current signals are provided by 720 cycle alternator 20. This alternator is connected to the distribution system through normally open contacts 21 of relay 22 and a suitable coupling network. Thus, the alternator is connected to the system, thereby transmitting carrier-current signals, only when relay 22 is actuated by energizing its coil. Relays 19 and 22 are controlled, as hereinafter explained, by contacts 15 and 16 operating through control circuits 23.

Referring now to Figs. 1 and 2, assume that the load requirements on the distribution system are as represented at point 24 on curve 2, and that all water heaters have been connected to the distribution system. Contacts 15 are closed, and contacts 16 are open. However, since all of the water heaters are already connected to the system, the control circuits 23 operate, as hereinafter explained, to keep contacts 21 open, and no carrier-current signal is transmitted. Assume now that the system load increases until the level represented by broken line 4 is exceeded. Contacts 15 open, but this has no effect at this time. Assume now that the load continues to increase, until at point 25 the level represented by broken line 3 is exceeded. At this point, contacts 16 close. This operates the control circuits, as hereinafter explained, to actuate relay 22 for 40 seconds. This connects alternator 20 to the distribution system for a period of 40 seconds, and thus transmits a 40 second carrier-current signal through the system. The 40 second signal actuates all of the load switches 9 and causes them to disconnect their water heaters 8 from the distribution system.

Assume now that point 26, Fig. 1, has been reached and that the power system load, represented by curve 1, has just fallen slightly below the level represented by line 4. Contacts 15 close. The control circuits 23 actuate relay 19, and also relay 22. The operation of relay 22 connects alternator 20 to the distribution system, thus sending a carrier current signal which, in three seconds, begins turning on the load switches 9, thereby connecting a portion of the water heaters 8 to the distribution system. As the water heaters are connected, the system load increases, but contacts 15 are kept closed by the bias applied to relay 10 by the operation of relay 19 until the point 27, Fig. 1, is reached, at which point the bias is overcome and contacts 15 open. This causes the control circuits 23 to deenergize relays 19 and 22, and thus stops the carrier-current signal, so that no more load switches are turned on at this time. However, when point 28 is reached, contacts 15 again close and the operation is repeated to add another increment of load. At point 29, a third increment of load is added. This time, assume that the power requirements on the system do not reach the level represented by line 5, and therefore contacts 15 remain closed. Under these conditions, control circuits 23 actuate relays 19 and 22 for a period of 12 seconds, which is long enough to turn on all of the load switches and thereby connect all of the water heaters to the system.

Fig. 3 illustrates the control circuits 23. When closed, contacts 15 actuate a relay 30 having normally open contacts 31 and 32 and normally closed contacts 33. Similarly, contacts 16 when closed actuate a relay 34 having normally open contacts 35 and 36 and normally closed contacts 37. Once it is actuated, relay 30 is kept energized for a period of about one minute by contacts 31 and 37 and the normally closed contacts 38 of a time-delay relay 39. Similarly, relay 34, when once actuated, is kept energized by contacts 35, 33 and 38. In about one minute after relay 30 or relay 34 is actuated, time-delay relay 39 operates to open contacts 38, thereby ending the "holding" action, whereupon relays 30 and 34 will be deenergized unless contacts 15 or 16 remain closed.

The purpose of this holding action is to minimize the adverse effects of relay chatter. Load conditions in the power distribution system may fluctuate at a rapid rate, thereby producing repeated opening and closing in rapid succession, or "chatter," of contacts 15 or contacts 16. Without the holding arrangement, this chatter could produce electrical arcing, with consequent rapid deterioration of the contacts. With the holding arrangement described, no more than one operation per minute is possible for relays 30 and 34; and also, during the one minute holding period, current is by-passed around contacts 15 and 16 so that no harmful arcing occurs even though these contacts may tend to chatter.

For purposes hereinafter described, a latch-type differential relay is provided having opposing coils 40 and 41 and having contacts 42 and 43. Whenever coil 41 is energized, contacts 42 are closed and contacts 43 are opened. The contacts remain latched in this position until coil 40 is energized, whereupon contacts 42 are opened and contacts 43 are closed. A second, similar latch-type differential relay has opposed coils 44 and 45 and contacts 46. Coil 44 operates to open contacts 46, while coil 45 operates to close contacts 46.

Another relay 47 has normally open contacts 48, 49, 50 and 51. A relay 52 has normally open contacts 53, 54, 55 and 56 and normally closed contacts 57. Still another relay 58 has normally open contacts 59 and normally closed contacts 60.

A time-delay relay 61 operates only after its coil has been energized for a period of three minutes. This relay has normally open contacts 62 and 63. A time-delay relay 64 has normally open contacts 65 which are closed when the coil of the relay is energized for twelve seconds. A time-delay relay 66 has normally open contacts 67 which are closed whenever the relay is energized for forty seconds. The various relays and contacts are inter-connected as shown.

Assume that all of the water heaters are disconnected, that the relay contacts are in the position shown in Fig. 3, and that contact 15 is now closed by a decrease in the system load. This actuates relay 30. Relay 47 is now energized through contacts 32, 43 and 57, which in turn energizes relays 61 and 39 by closing contacts 49. Relay 30 is held in the actuated position, as hereinbefore explained, until time-delay relay 39 operates to open contacts 38.

After about one minute, relay 39 opens contacts 38, and relay 30 will become de-energized unless contacts 15 remain closed. However, if contacts 15 remain continuously closed for an additional period of two minutes, making three minutes in all since the first closing, relay 61 will operate to close contacts 62 and 63. This time delay insures that no carrier-current signals will be transmitted as a result of transient, short duration disturbances in the power system.

When contacts 62 close, relay 22 is energized through contacts 60, thereby connecting the 720 cycle alternator to the distribution system and starting the transmission of carrier-current signals which, in about three seconds, begin to turn on the load switches and connect water heaters to the system. Also, relay 64 is energized through contacts 62 and 48. At the same time, relay 19 is energized, thus applying a bias to the watt-responsive relay 10 to keep contacts 15 closed until the desired increment of load has been added to the system. Relay 46 is closed, as hereinafter explained, so that an "off" signal can be transmitted to the load switches if the system load should increase sufficiently to close contacts 16.

Assume now that the carrier-current signal has been transmitted for five seconds, and that a sufficient number of water heaters have been added to the line to increase the system load by such an amount that, together with other changes in the system load, the bias applied to relay 10 by inductors 17 is overcome, and contacts 15 open. Relay 30, relay 47, relays 61, 64, and 19, and relay 22 are thereupon de-energized in the order named, and transmission of the carrier-current signals ceases.

Now assume that contacts 15 are closed for a sufficient period of time to connect all of the water heaters, that is, a signal of twelve seconds' duration is transmitted. At the end of twelve seconds, relay 64 closes contacts 65, thereby energizing relay 58 through contacts 65 and 62. This opens contacts 60, thereby de-energizes relay 22, and disconnects the 720 cycle alternator from the distribution system. Thus, an "on" signal has a maximum duration of twelve seconds, after which all of the water heaters remain connected to the system. Contacts 42 are closed, and contacts 43 are opened, as hereinafter explained, so that the next signal transmitted to the load switches can only be an "off" signal.

Now assume that the power requirements on the distribution system rise to such a level that contacts 16 close. This energizes relay 34. Then relay 52 is energized through contacts 36 and either contacts 42 or contacts 46, one of which will be closed, as hereinafter explained, if any water heater is connected to the system. When relay 52 is actuated, relays 61 and 39 are energized through contacts 55. After three minutes, assuming that contacts 16 remain closed continuously during the last two of the three minutes, relay 61 closes contacts 62 and 63. Relay 22 is energized through contacts 62 and 60, thereby beginning the transmission of a carrier-current signal. Relay 52 is now held closed by contacts 63, 56 and 42 or 46. Also, relay 66 is energized through contacts 62 and 54. Relays 19 and 64 remain unenergized. After about forty seconds, relay 66 closes contacts 67, thereby energizing relay 58 and opening contacts 60. This de-energizes relay 22, and disconnects the 720 cycle alternator from the system. Thus, an "off" signal is always of about forty seconds' duration, which is sufficient to turn all of the load switches off and disconnect all water heaters from the system.

Whenever an "on" signal of twelve seconds' duration is transmitted, thereby connecting all of the water heaters to the system, relay coil 41 is energized through contacts 59 and 51, thereby closing contacts 42 and opening contacts 43, so that the next signal transmitted can only be an "off" signal. Whenever an "off" signal is transmitted, relay coil 40 is energized through contacts 59 and 53, so that the next signal transmitted can only be an "on" signal. Moreover, whenever an "on" signal of less than twelve seconds' duration is transmitted, contacts 43 remain closed, and relay coil 45 is energized through contacts 62, 60 and 59, thereby closing contacts 46, so that the next transmission can be either an "on" signal or an "off" signal. Whenever relay 59 is actuated, relay coil 44 is energized through contacts 59, thereby reopening contacts 46. Thus, only "on" signals are possible when no heaters are connected, only "off" signals are possible when all heaters are connected, and either "on" or "off" signals are possible when only part of the heaters are connected.

In actual practice, it may be desired that relay 22 operate other control circuits which first start alternator 20, then connect it to the distribution system after it has attained rated speed, so that the alternator need not run continuously. In this case, relays 64 and 66 are so connected that they are not energized until the alternator is fully connected. Also, manual controls for sending additional carrier-current signals may be added. However, addition of such features is believed to be within the skill of the art, and since an understanding of our invention is not affected thereby, they need not be more fully explained here.

Although the present invention is not concerned with the load switch per se, Fig. 4 illustrates one form of load switch which may be used with this invention. Connections 68 lead to the distribution system, through suitable distribution transformers if required. Connections 69 lead to the load device, which may be a domestic hot water heater. A relay coil 70 is connected across the line in series with a capacitor 71, thereby forming a series-resonant circuit which is tuned approximately to the 720 cycle carrier-current frequency. Thus, the relay and capacitor circuit has a relatively low impedance to the carrier-current frequency, and a much higher impedance to the 60 cycle power frequency. By this means, the relay is adapted to respond to 720 cycle carrier-current signals, but not to the 60 cycle line currents.

Whenever a carrier-current signal is received, relay 70 is energized, thereby closing the normally open relay contacts 72. This energizes a transformer 73 which applies heating current to a bimetallic thermostat element 74. The heating current causes thermostat 74 to deflect sufficiently, in a period of three to twelve seconds, to cause toggle mechanism 75 to close switch 76, thereby connecting the load device to the distribution system. When the carrier-current signal ends, thermostat 74 cools, but switch 76 remains closed.

On the other hand, a carrier-current signal of twenty to forty seconds' duration heats thermostat 74 for a longer time, and thereby causes it to deflect a sufficient amount that toggle mechanism 75 engages a latch 77. Thereupon, when the carrier-current signal stops and thermostat 74 cools, toggle mechanism 75 is rotated in such a way that switch 76 is opened, and the load device is disconnected from the distribution system. If the water heater includes a thermostat for controlling the water temperature, its contacts may be connected in series between the load switch and the heating element.

It will be understood that our invention is not limited to the specific embodiments herein illustrated and described, and that the following claims are intended to cover all changes and modifications which do not depart from the true spirit and scope of the invention.

What we claim as new and desire to secure by Letters Patent of the United States is:

1. Apparatus for transmitting carrier-current load control signals through an electric power distribution system in accordance with varying power requirements on the system, comprising carrier-current supply means, a watt-responsive device having contacts which close only when the power requirements on the system fall below a preset value, biasing means for selectively raising said preset value by a predetermined amount to keep said contacts closed until such power requirements increase by a desired increment, and means controlled by said contacts for automatically connecting said supply means to the distribution system and actuating said biasing means.

2. Apparatus for transmitting carrier-current load control signals through an electric power distribution system in accordance with varying power requirements on the system, comprising carrier-current supply means, a watt-responsive relay having actuating coils connected to the distribution system and having contacts which close only when the power requirements on the system fall below a preset value, biasing means for selectively raising said preset value by a predetermined amount to keep said contacts closed until such power requirements increase by a desired increment, said biasing means comprising impedance elements selectively connected in series with respective coils of said relay, and means controlled by said contacts for automatically connecting said supply means to the distribution system and connecting said impedance elements in series with such coils.

3. Apparatus for transmitting carrier-current load control signals through an electric power distribution system in accordance with varying power requirements on the system, comprising an alternator operable at carrier-current frequency, relay means for selectively connecting said alternator to the distribution system to transmit carrier-current signals, a watt-responsive relay having potential and current coils connected to the distribution system and having contacts which close only when the power requirements on the system fall below a preset value, biasing means for selectively raising said preset value by a predetermined amount to keep said contacts closed until such power requirements increase by a desired increment, said biasing means consisting of a plurality of adjustable inductors and relay means for selectively connecting said inductors in series with respective potential coils of said watt-responsive relay, and means controlled by said contacts for automatically actuating the relay means for connecting said alternator to the system and also actuating the relay means for connecting said inductors in series with the potential coils.

4. Apparatus for transmitting carrier-current load control signals through an electric power distribution system in accordance with varying power requirements on the system, comprising carrier-current supply means, a watt-responsive device having contacts which close only when the power requirements on the system fall below a preset value, first relay means actuated by said contacts, holding means to keep said first relay means closed for a first predetermined time interval, other relay means actuated by said first relay means after a second longer predetermined time interval, and means controlled by said other relay means for connecting said supply means to the distribution system.

5. Apparatus for transmitting carrier-current load control signals through an electric power distribution system in accordance with varying power requirements on the system, comprising carrier-current supply means, a watt-responsive device having a first set of contacts which close only when the power requirements on the system fall below a first preset value and having a second set of contacts which close only when the power requirements on the system exceed a second greater preset value, a first relay actuated by the closing of said first set of contacts, a second relay actuated by the closing of said second set of contacts, time-delay relay means for holding said first and second relays respectively actuated for a first predetermined time interval, other time-delay relay means actuated by said first and second relays after a second longer predetermined time interval, and means controlled by said other time-delay relay means for connecting said supply means to the distribution system.

6. Apparatus for transmitting carrier-current load control signals through an electric power distribution system in accordance with varying power requirements on the system, comprising an alternator operable at carrier-current frequency, relay means for selectively connecting said alternator to the distribution system to transmit carrier-current signals, a watt-responsive relay having potential and current coils connected to the distribution system and having a first set of contacts which closes only when the power requirements on the system fall below a first preset value and having a second set of contacts which close only when the power requirements on the system exceed a second greater preset value, biasing means for selectively raising said first preset value a predetermined amount to keep said first set of contacts closed until such power requirements increase by a desired increment, said biasing means consisting of two adjustable inductors and relay means for selectively connecting said inductors in series with respective potential coils of said watt-responsive relay, a first control relay actuated by the closing of said first set of contacts, a second control relay actuated by the closing of said second set of contacts, time-delay relay means for holding said first and second control relays respectively actuated for a first predetermined time interval, other time-delay relay means actuated by said first and second control relays after a second longer predetermined time interval, and means controlled by said other time-delay relay means for automatically actuating the relay means for connecting said alternator to the system and also actuating the relay means for connecting said inductors in series with the potential coils.

7. A load control system for selectively connecting a plurality of load devices to an electric power distribution system in accordance with varying power requirements on the system, comprising a plurality of load switches respectively connected between such load devices and the system, each of said load switches being operable to connect its associated load device to the system upon receipt of a carrier-current signal of about three to twelve seconds' duration and operable to disconnect its associated load device from the system upon receipt of a carrier-current signal of about twenty to forty seconds' duration, carrier-current supply means, a watt-responsive device having a first set of contacts which close only when the power requirements on the system fall below a first preset value and a second set of contacts which close only when the power requirements on the system exceed a second greater preset value, biasing means for selectively raising said first preset value by a predetermined amount to keep said first set of contacts closed until such power requirements increase by a desired increment, means controlled by said first set of contacts for automatically connecting said supply means to the distribution system and actuating said biasing means for a time interval in the order of three to twelve seconds, and means controlled by said second set of contacts for automatically connecting said supply means to the distribution system for a time interval in the order of forty seconds.

DONALD R. HYER.
EDWARD E. LYNCH.

No references cited